United States Defensive Publication [19] (H) [11] T962,008
Chandra et al. [43] Sept. 6, 1977

[54] METHOD OF TREATING POLYMER LATICES

[75] Inventors: Bala Perampalam Chandra, Huntingdon; Jeffrey Chester Greaves; Victor Gordon Lovelock, both of Welwyn Garden City, all of England

[73] Assignee: Imperial Chemical Industries Limited, London, England

[21] Appl. No.: 728,994

[22] Filed: Oct. 4, 1976

[30] Foreign Application Priority Data

Oct. 13, 1975 United Kingdom ..... 41848/75

[51] Int. Cl.[2] ..... C08F 6/16
[52] U.S. Cl. ..... 528/500; 526/344

[57] ABSTRACT

In accordance with the invention, a method of continuously treating an aqueous latex of a synthetic polymer contaminated with unreacted residual monomer used in the production of the polymer, comprises feeding the aqueous latex as a spray into a vessel defining a chamber so that all or a substantial quantity of the droplets of spray avoid contact with the side wall of the chamber, and contacting the falling spray with steam flowing counter-current thereto, whereby residual monomer is separated from the latex and is removed with the flow of steam leaving the chamber. Preferably at least 80% by weight of the droplets of spray avoid contact with the side wall of the chamber. Apparatus which includes the vessel and means to provide a flow of steam up the chamber to contact the falling spray is also disclosed.

In this method all or most of the spray falls directly to the bottom of the chamber without touching the side wall of the chamber. In this way foaming difficulties are avoided. The droplets of spray are contacted by the rising steam and monomer is removed with the steam flow. The latex which collects in the bottom of the vessel may be removed by any convenient method, e.g. by allowing it to run out of the chamber by gravity or by pumping it out of the chamber.

The chamber used in this method is conveniently defined by a wide cylindrical tube, the spray being introduced through a spraying head at the top of the tube. The size of the chamber used will depend, inter alia, on the required residence time of the latex in the chamber; the efficiency of monomer removal will depend on the residence time of the latex at a particular contact temperature. In this method a plurality of such chambers may be operated sequentially or contemporaneously.

The steam is preferably introduced into the chamber through a single injection point positioned at or near the bottom of the chamber although one or more injection points intermediate of the top and bottom of the vessel may be used as well.

The temperature of the steam before injection into the chamber may be within the range 60°–150° C, but is preferable at or near 100° C. The temperature of the steam inside the chamber may be adjusted by varying the pressure inside the chamber below atmospheric pressure, although for convenience, the pressure inside the chamber is often atmospheric so that the temperature of steam inside the reaction is at or near 100° C and this is a satisfactory arrangement for the treatment of many latices.

The method of the invention is especially suitable for the removal of vinyl chloride monomer from a homo- or copolymer of vinyl chloride.

14 Claims, 1 Sheet Drawing,

13 Pages Specification

The file of this unexamined application may be inspected and copies thereof may be purchased (849 O.G. 1221, Apr. 9, 1968).

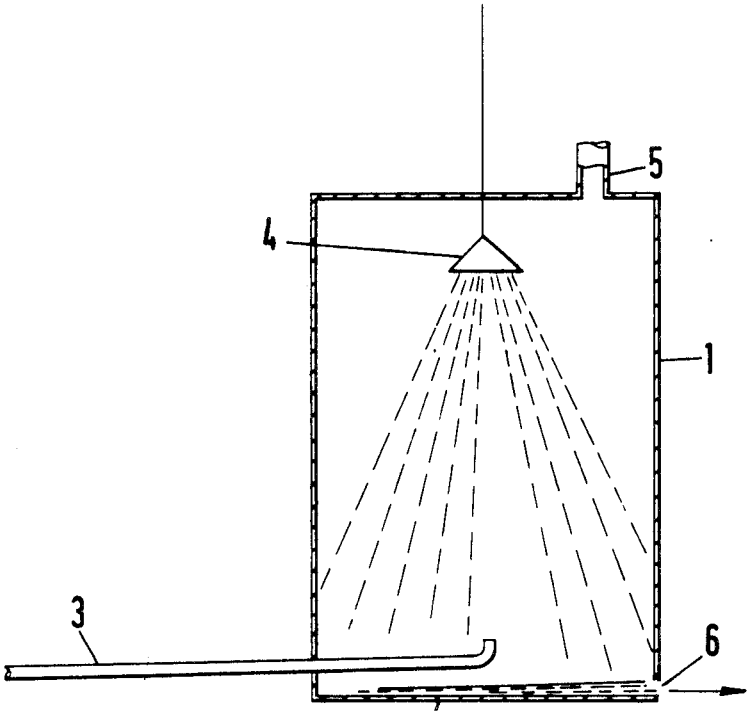

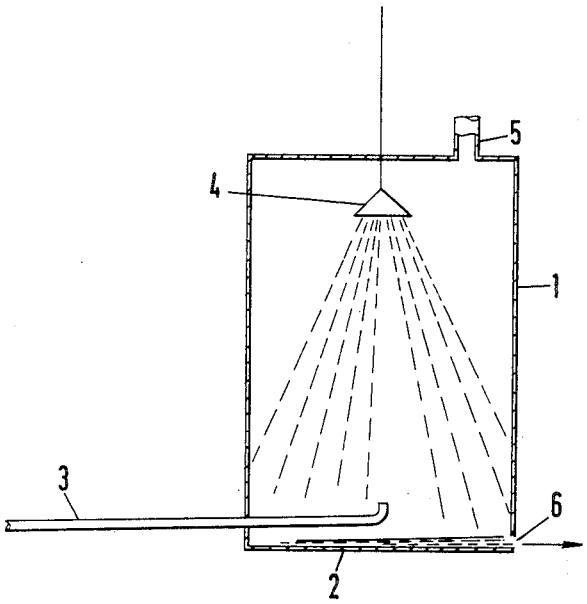
5
4
1
3
6
2